US011117639B2

United States Patent
Chan et al.

(10) Patent No.: US 11,117,639 B2
(45) Date of Patent: Sep. 14, 2021

(54) ROTATABLE FOLDING BICYCLE STEM

(71) Applicant: Kuei-I Chan, Taichung (TW)

(72) Inventors: Kuei-I Chan, Taichung (TW); Stephan Hahn, Taichung (TW)

(73) Assignee: Kuei-I Chan, Taichung (TW)

( * ) Notice: Subject to any disclaimer, the term of this patent is extended or adjusted under 35 U.S.C. 154(b) by 0 days.

(21) Appl. No.: 16/971,391

(22) PCT Filed: Mar. 5, 2018

(86) PCT No.: PCT/CN2018/078046
§ 371 (c)(1),
(2) Date: Aug. 20, 2020

(87) PCT Pub. No.: WO2019/169533
PCT Pub. Date: Sep. 12, 2019

(65) Prior Publication Data
US 2021/0001949 A1 Jan. 7, 2021

(51) Int. Cl.
*B62K 21/16* (2006.01)
*B62K 15/00* (2006.01)

(52) U.S. Cl.
CPC .............. *B62K 21/16* (2013.01); *B62K 15/00* (2013.01)

(58) Field of Classification Search
CPC ........ B62K 21/12; B62K 21/16; B62K 21/18; B62K 21/22; B62K 21/24; B62K 19/30; B62K 19/32; B62K 11/14
See application file for complete search history.

(56) References Cited

U.S. PATENT DOCUMENTS

| 5,562,013 A * | 10/1996 | Kao ...................... B62K 21/16 403/81 |
| 6,206,395 B1 * | 3/2001 | Young .................... B62K 21/16 280/278 |

(Continued)

FOREIGN PATENT DOCUMENTS

| CN | 2184633 Y | 12/1994 |
| CN | 2578217 Y | 10/2003 |

(Continued)

OTHER PUBLICATIONS

Machine translation of WO 2015/080369, obtained May 4, 2021.*

*Primary Examiner* — Richard W Ridley
*Assistant Examiner* — Brian J McGovern
(74) *Attorney, Agent, or Firm* — Karin L. Williams; Alan D. Kamrath; Mayer & Williams PC (57) ABSTRACT

A rotatable folding bicycle stem includes a stem rotatably mounted on the standpipe with defining a stem rotating axis. An upper end of the stem terminates in a forwardly projecting O-shaped loop. A distance between the stem rotating axis to a center of the O-shaped loop is smaller than a distance between the standpipe rotating axis to the center of the O-shaped loop. A space between the handlebar and the frame could be reduced or became smaller by utilizing the present invention. The smaller folded size of the folding bicycle facilitates storage by users and is beneficial in that the bicycle may be stacked or compacted more tightly when loading in a cargo car of a container for delivery, thereby reducing a shipping cost for a single bike and increasing a loading quantity in single container.

14 Claims, 12 Drawing Sheets

(56) References Cited

U.S. PATENT DOCUMENTS

| | | | | |
|---|---|---|---|---|
| 2002/0167151 | A1* | 11/2002 | Tseng | B62K 15/008 |
| | | | | 280/287 |
| 2006/0096408 | A1* | 5/2006 | Liao | B62K 21/16 |
| | | | | 74/551.1 |
| 2006/0099027 | A1* | 5/2006 | Liao | B62K 21/12 |
| | | | | 403/322.4 |
| 2006/0179969 | A1* | 8/2006 | Lin | B62K 21/12 |
| | | | | 74/551.1 |
| 2012/0125145 | A1* | 5/2012 | VanderVeen | B62K 21/16 |
| | | | | 74/551.8 |
| 2015/0033904 | A1* | 2/2015 | Chu | B62K 21/16 |
| | | | | 74/551.4 |
| 2015/0050073 | A1* | 2/2015 | Forgrave | B62K 21/16 |
| | | | | 403/188 |
| 2017/0327180 | A1* | 11/2017 | Hasenyager | B62K 21/22 |
| 2019/0023348 | A1* | 1/2019 | Taylor | B62K 21/22 |

FOREIGN PATENT DOCUMENTS

| | | | | |
|---|---|---|---|---|
| CN | 102085895 | A | 6/2011 | |
| CN | 204801997 | U | 11/2015 | |
| JP | 3193432 | B2 | 10/2014 | |
| KR | 20100009734 | U | 10/2010 | |
| WO | WO-2015080369 | A1 * | 6/2015 | B62K 21/16 |

* cited by examiner

ROTATABLE FOLDING BICYCLE STEM

FIELD OF INVENTION

The present invention is related to a bicycle stem, especially to a folding bicycle stem for a folding bicycle which could make a handlebar closer to its frame and reduces a width of the structure when folding the folding bicycle.

BACKGROUND OF THE INVENTION

A conventional folding bicycle normally has a movable or rotatable joint at a frame to fold the bicycle for carrying, storing or stacking. To avoid a handlebar of the conventional folding bicycle taking too much space, the handlebar could be designed to disassemble or detach from the bike in order to fold the bicycle smaller. However, this design structure is not suitable and will cause a lot of trouble in the folding bicycle, especially an electric kind, having some complex mechanisms or controllers on the handlebar to disassemble or reattach from the bike. Alternatively, the handlebar of this kind of bicycle choosing to be rotated in 90 degrees making the handlebar in a parallel position along the frame after folding became a desirable idea of production design.

To a manufacturer of the conventional folding bicycle, although the rotatable handlebar as mentioned above is provides much more convenience to be carried, stored or stacking easily, it is still a requirement and desirable to make a folded size of the conventional folding bicycle flatter or smaller when it comes to shipping or delivery. Because a length between a rotating center of a stem and the handlebar is fixed, it is impossible to achieve a smaller folded size or a flatter state as desired even when the handlebar of the folding bicycle is folded. Therefore, these folded bicycles will still require enormous space when loading on a cargo car or a container. In addition, there is also a kind of small folding bicycle having its folding mechanisms using a standpipe and a stem connected with its front fork which could be rotated or turned aside. Problems are that a size of this folding mechanism cannot match with an ordinary folding bicycle and needs to be a customized production. Hence, it is eager to have a novel rotatable folding bicycle stem for folding bicycle that will overcome or substantially ameliorate at least one or more of the deficiencies of a prior art, or to at least provide an alternative solution to the problems. It is to be understood that, if any prior art information is referred to herein, such reference does not constitute an admission that the information forms part of the common general knowledge in the art.

SUMMARY OF THE INVENTION

Because the length between the rotating center of the stem and the handlebar is fixed, the conventional folding bicycle still takes up a lot of space even when folded. The present invention provides a solution for making the stem defining with two rotating axis which could allow the stem structure of the present invention to have a smaller folded size after folding.

In order to solve the shortcomings of a conventional folding bicycle to be smaller or flatter after folding, the present invention is required. A rotatable folding bicycle stem includes a stem rotatably mounted on the standpipe with defining a stem rotating axis. An upper end of the stem terminates in a forwardly projecting O-shaped loop. A distance between the stem rotating axis to a center of the O-shaped loop is smaller than a distance between the standpipe rotating axis to the center of the O-shaped loop in a same plane surface.

In accordance, an angle formed by the standpipe rotating axis and the stem rotating axis is in a range of 0 to 30 degrees.

In accordance, a standpipe receiving surface in a tubular shape is formed inwardly from a bottom of the standpipe receiving portion, and the standpipe rotating axis is defined at a center of the standpipe receiving surface.

In accordance, the standpipe receiving portion includes a tubular part with its upper end of which terminates in a deck part. A stem receiving groove with circular aperture is formed at a top surface of the deck part. The stem rotating axis is defined at a center of the stem receiving groove. The stem comprises a stem body with a tubular neck portion extended downwardly from a bottom of the stem body. The tubular neck portion is adapted to be inserted into the stem receiving groove.

In accordance, the standpipe receiving portion includes a tubular part with its upper end of which terminates in a deck part. A stem receiving groove with circular aperture is formed at a top surface of the deck part. The stem rotating axis is defined at a center of the stem receiving groove. The stem includes a stem body with a rotating member detachably extended downwardly from a bottom of the stem body. The rotating member is adapted to be inserted into the stem receiving groove.

In accordance, a slot is formed at middle of a front end of the standpipe receiving portion. The slot is connected with the standpipe receiving surface of the standpipe. A fixing hole is formed transversely through the deck part corresponding to a position of the slot. A stem fixing assembly is mounted on the fixing hole.

In accordance, two fixing bolt holes are set vertically penetrating through a front side of the tubular part on its left corresponding to a left side of the slot. A long groove is formed from a bottom of the tubular part. Two connecting tunnels are set vertically penetrating through the slot and the long groove. A pin is adapted to be inserted into the long groove. Two screw holes are set vertically forming transversely through the pin, and two fixing bolts are threadably connected and fixed with the screw holes respectively through the slot and each connecting tunnels.

In accordance, the stem fixing assembly includes a control handle. An end of the control handle is provided with an enlarged pivot portion, a screw rod is extended from the pivot portion and is threadably fixed with the fixing hole. After passing through the fixing hole, a terminate end of the screw rod is adapted to be fixed with a screw nut.

In accordance, a positioning pin groove is formed inwardly at the top of the deck part. A pin hole is extended vertically in length and is formed at a lateral side of the positioning pin groove and the standpipe receiving portion. Another positioning pin groove is formed inwardly at a bottom of the stem corresponding to a position of the positioning pin groove formed at the top of the deck part. A positioning pin is mounted inside the positioning pin groove of the deck part. A spring is mounted at a bottom of the positioning pin inserted inside the positioning pin groove of the deck part. An upper tip of the positioning pin is protruded from the positioning pin groove of the deck part and is accepted by the positioning pin groove of the stem. A pulling pin is connected with the positioning pin with its end protruded through the pin hole of the standpipe receiving portion.

In accordance, a positioning pin groove is formed inwardly at the top of the deck part. A pin hole is extended vertically in length and is formed at a lateral side of the positioning pin groove and the standpipe receiving portion. Another positioning pin groove is formed inwardly at a bottom of the stem corresponding to a position of the positioning pin groove formed at the top of the deck part. A positioning pin is mounted inside the positioning pin groove of the deck part. A spring is mounted at a bottom of the positioning pin inserted inside the positioning pin groove of the deck part, an upper tip of the positioning pin is protruded from the positioning pin groove of the deck part and is accepted by the positioning pin groove of the stem. A pulling pin is connected with the positioning pin with its end protruded through the pin hole of the standpipe receiving portion.

In accordance, the present invention has the following advantages.

The present invention could be easily assembled on the folding bicycle simply by inserting or adapting the standpipe receiving portion with a front fork of the folding bicycle and further mounting a handlebar on the stem. The present invention is hence securely assembled on a folding bicycle and ready to be ridden.

The other advantage of the present invention is that compared with the conventional folding bicycle also equipped with folded design of stem, a space between the handlebar and the frame could be reduced or became smaller of the present invention. After the stem of the present invention is released from the deck part, the stem is able to be rotated in 90 degree from both left to right. The distance between the stem rotating axis and the center of the O-shaped loop is smaller than the distance between the standpipe rotating axis and the center of the O-shaped loop. Therefore, the present invention is guaranteed of providing a smaller folded size of the folding bicycle for not only facilitating storage by users but also benefiting for being stacked or compacted more tightly when loading in a cargo car of a container for delivery. The present invention could both reduce a shipping cost for a single bike and increase a loading quantity in single container.

Many of the attendant features and advantages of the present invention will become better understood with reference to the following detailed description considered in connection with the accompanying figures and drawings.

BRIEF DESCRIPTION OF THE DRAWINGS

The steps and the technical means adopted by the present invention to achieve the above and other objects can be best understood by referring to the following detailed description of the preferred embodiments and the accompanying drawings.

DETAILED DESCRIPTION OF THE PREFERRED EMBODIMENTS

Reference will now be made in detail to the present preferred embodiments of the invention, examples of which are illustrated in the accompanying drawings. Wherever possible, the same reference numbers are used in the drawings and the description to refer to the same or like parts. It is not intended to limit the method by the exemplary embodiments described herein. In the following detailed description, for purposes of explanation, numerous specific details are set forth in order to attain a thorough understanding of the disclosed embodiments. It will be apparent, however, that one or more embodiments may be practiced without these specific details. As used in the description herein and throughout the claims that follow, the meaning of "a", "an", and "the" may include reference to the plural unless the context clearly dictates otherwise. Also, as used in the description herein and throughout the claims that follow, the terms "comprise or comprising", "include or including", "have or having", "contain or containing" and the like are to be understood to be open-ended, i.e., to mean including but not limited to.

With reference to FIGS. 1 to 5, a first preferred embodiment of a rotatable folding bicycle stem includes a standpipe receiving portion 10, a stem 20, a stem fixing assembly 30, and a stem positioning assembly 40. The stem 20 is adapted to be rotatably engaged with the standpipe receiving portion 10. The stem fixing assembly 30 is mounted on the standpipe receiving portion 10. The stem positioning assembly 40 is deposited between the standpipe receiving portion 10 and the stem 20.

Figure 1:
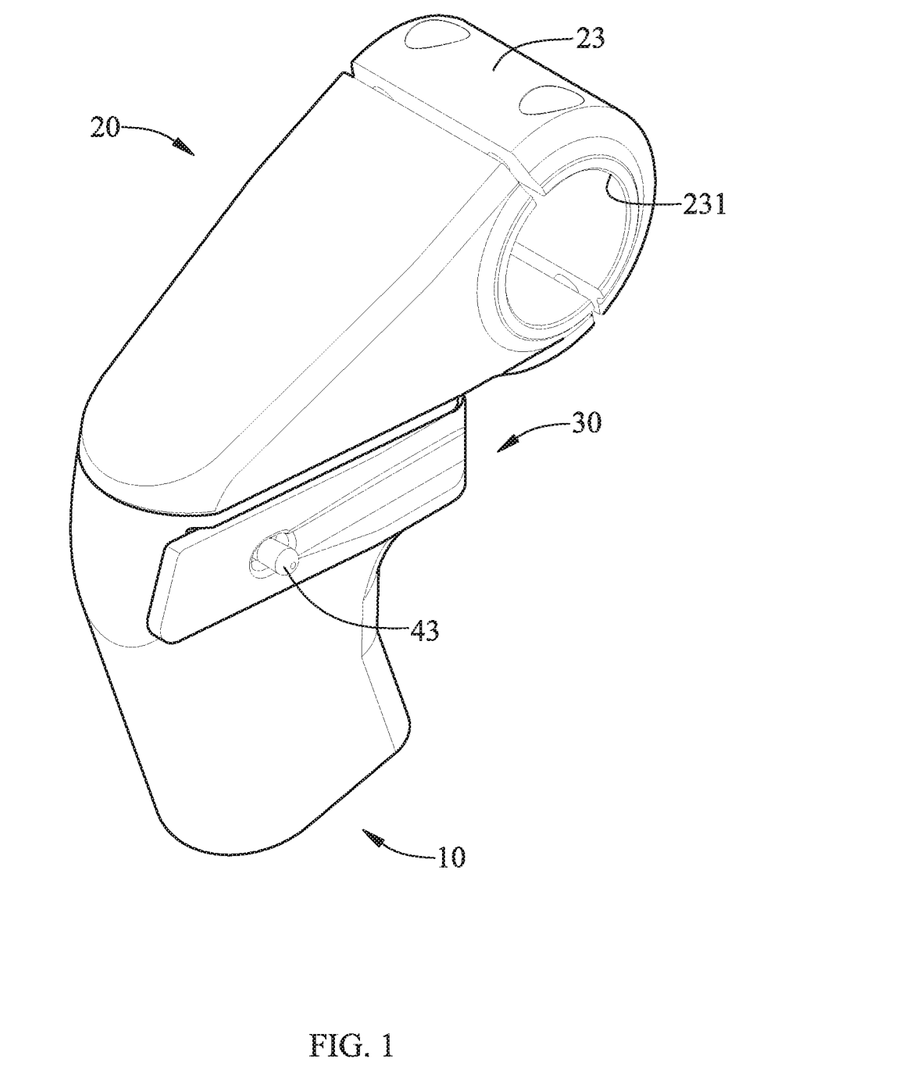
FIG. 1 is a perspective view of a preferred embodiment in accordance with the present invention.
Figure 2:
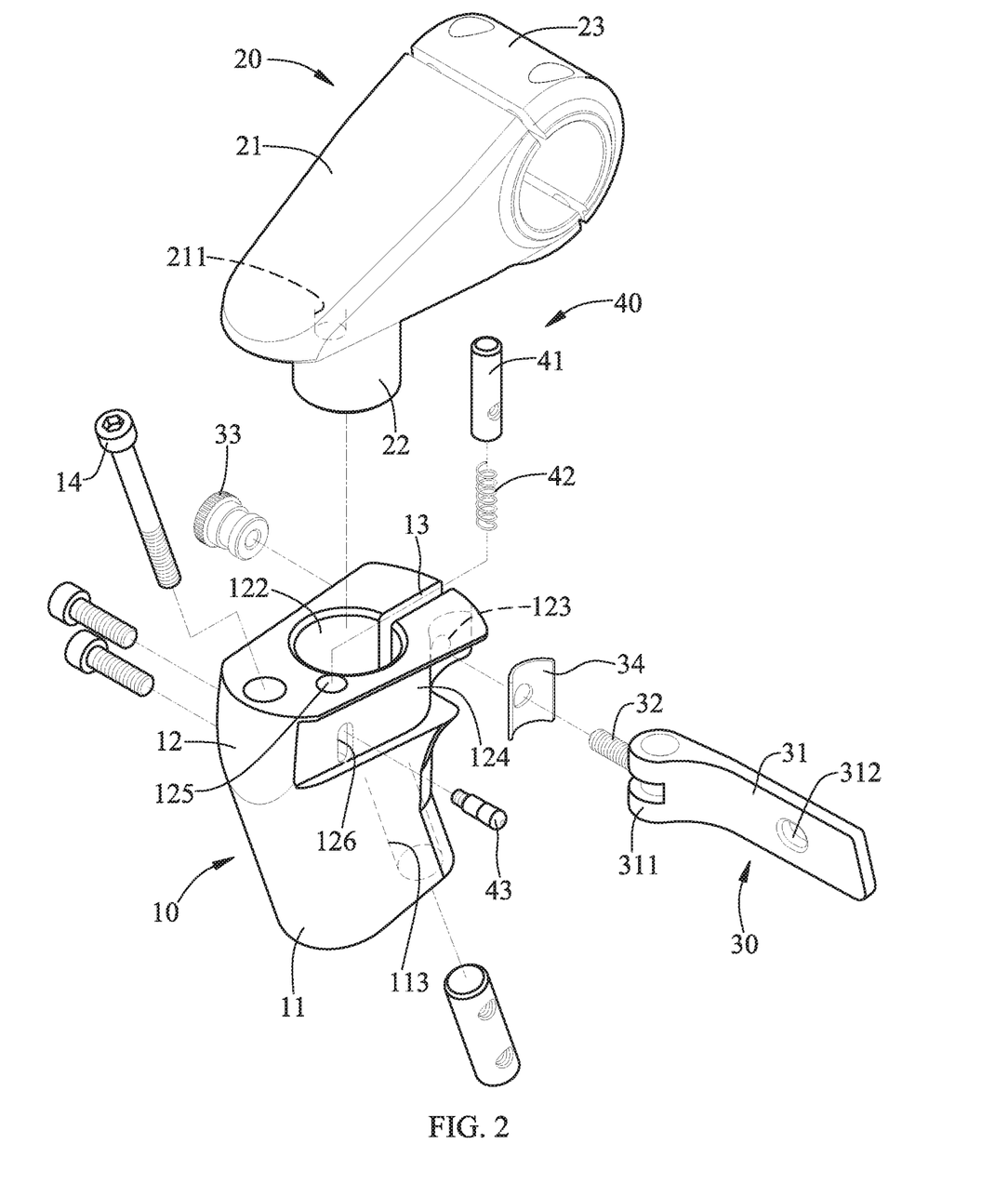
FIG. 2 is an exploded view of a preferred embodiment in accordance with the present invention.
Figure 3:
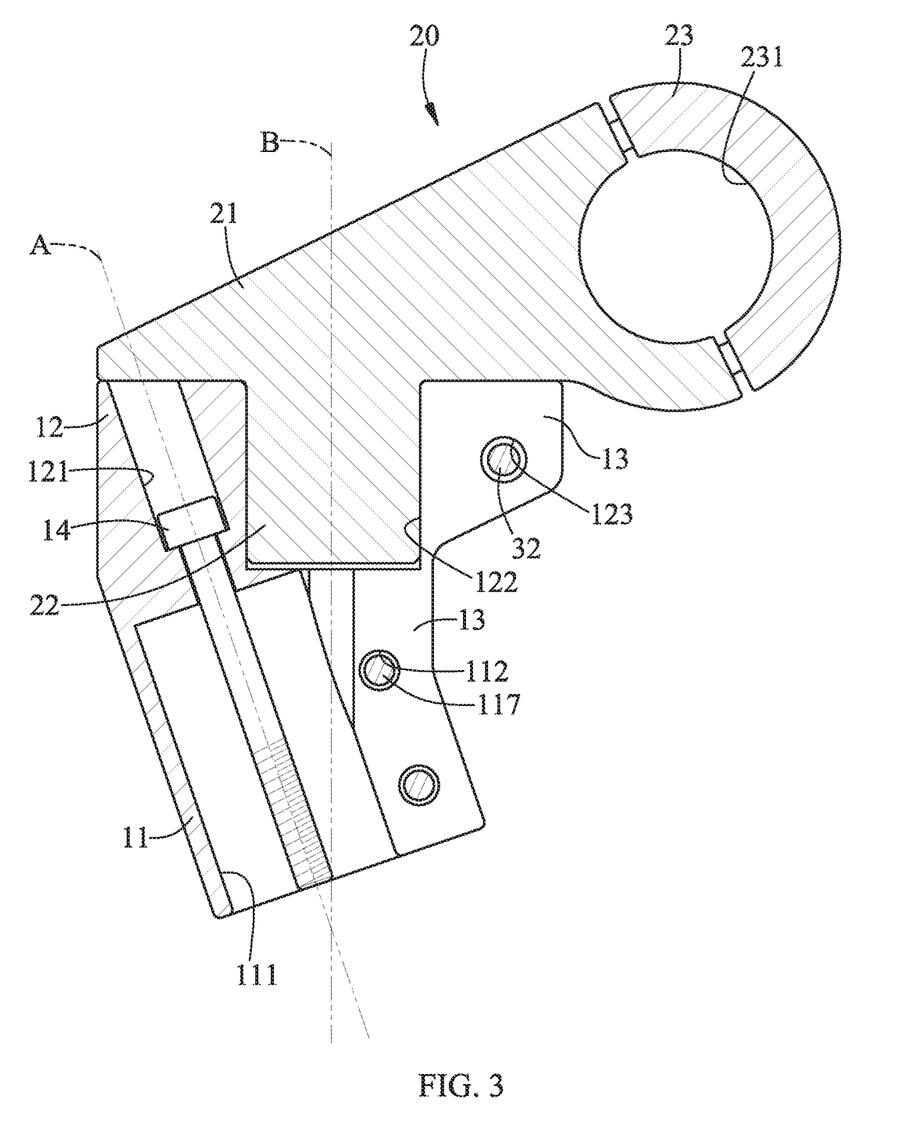
FIG. 3 is a cross-section view of a preferred embodiment in accordance with the present invention.

Further referring specifically to FIG. 2 to FIG. 5, the standpipe receiving portion 10 in this embodiment includes a tubular part 11 with its upper end of which terminates in a deck part 12. A top surface of the deck part 12 appears to be flat and its front side extending forwardly from the tubular part 11. A standpipe receiving surface 111 is formed inside the tubular part 11 and having an angle from its bottom inclined backwardly towards its top as shown in FIG. 3. The standpipe receiving surface 111 is a circular aperture with a close end at its top. An imaginary standpipe rotating axis A is defined inside the standpipe receiving portion 10 along with a center of the standpipe receiving surface 111. The standpipe rotating axis A is also inclined backwardly towards a rear side of the standpipe receiving portion 10. When the standpipe receiving portion 10 engages with a standpipe of a bicycle, the standpipe receiving portion 10 is able to be rotated with the standpipe along with the standpipe rotating axis A. Along with the standpipe rotating axis A, a standpipe bolt hole 121 is formed inside the deck part 12. The standpipe bolt hole 121 is a counterbore with its bottom connected with the standpipe receiving surface 111 of the tubular part 11. A standpipe bolt 14 is adapted to be inserted inside the standpipe receiving surface 111 through the standpipe bolt hole 121.

A stem receiving groove 122 is formed at a center of the top surface of the deck part 12. The stem receiving groove 122 also has a circular aperture. An imaginary stem rotating axis B is defined inside the stem receiving groove 122 extended vertically from the top surface of the deck part 12 (also vertically from a ground if the present invention is engaged with a folding bicycle). Preferably, an angle formed by the standpipe rotating axis A and the stem rotating axis B is desired to be in a degree at a range from 0 to 30 disclosed by the present invention (where an included angle being created by the standpipe rotating axis A and the stem rotating axis B on the right side of numeral 111 denotes in FIG. 3). In this embodiment, the angle formed by the standpipe rotating axis A and the stem rotating axis B is at a 20 degree. A slot 13 is formed vertically at a front side from the top of the deck part 12 to the bottom of the tubular part 11. The slot 13 is connected with the standpipe receiving surface 111 and the standpipe bolt hole 121.

Figure 4:
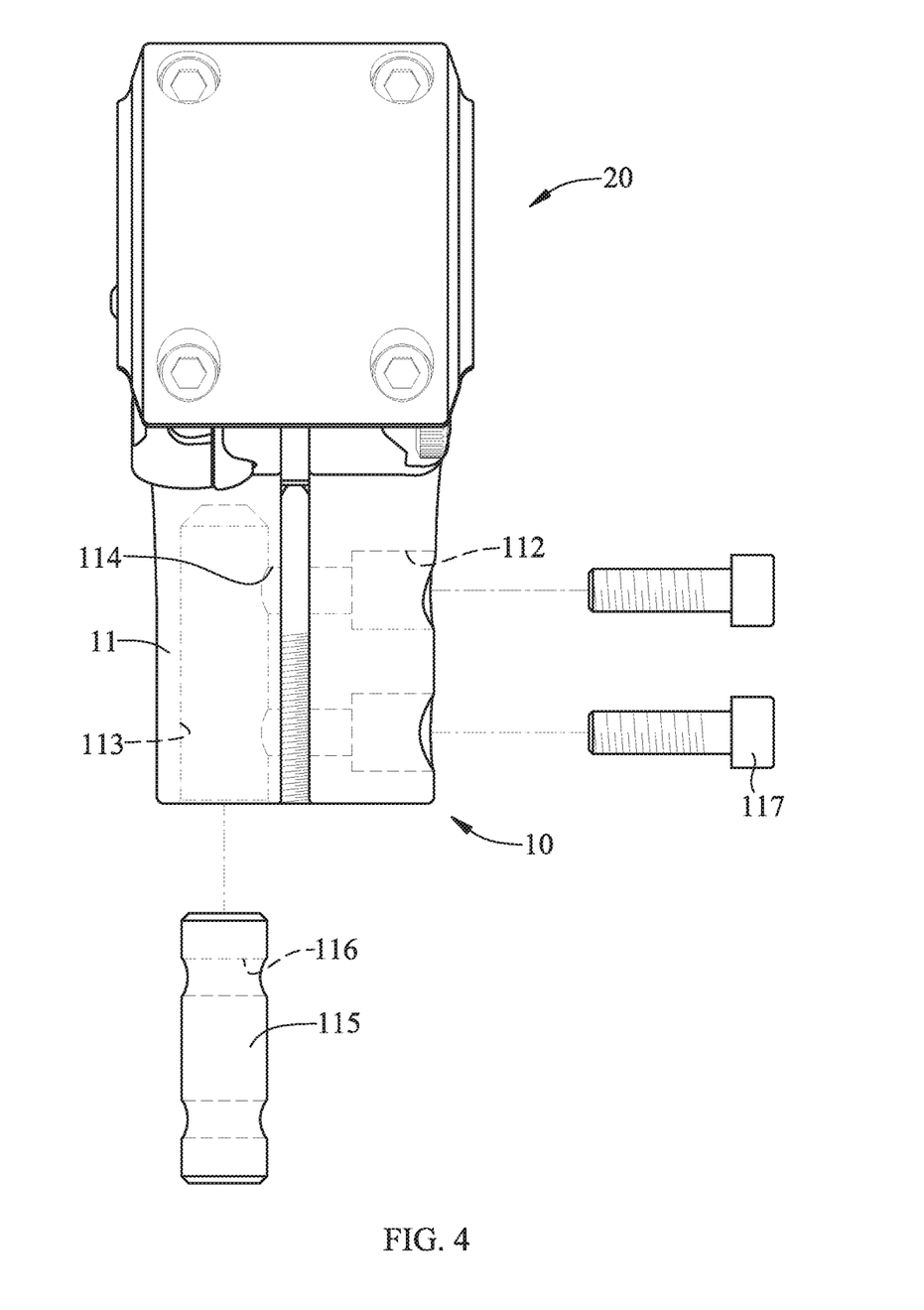
FIG. 4 is a front view of a preferred embodiment in accordance with the present invention.
Figure 5:
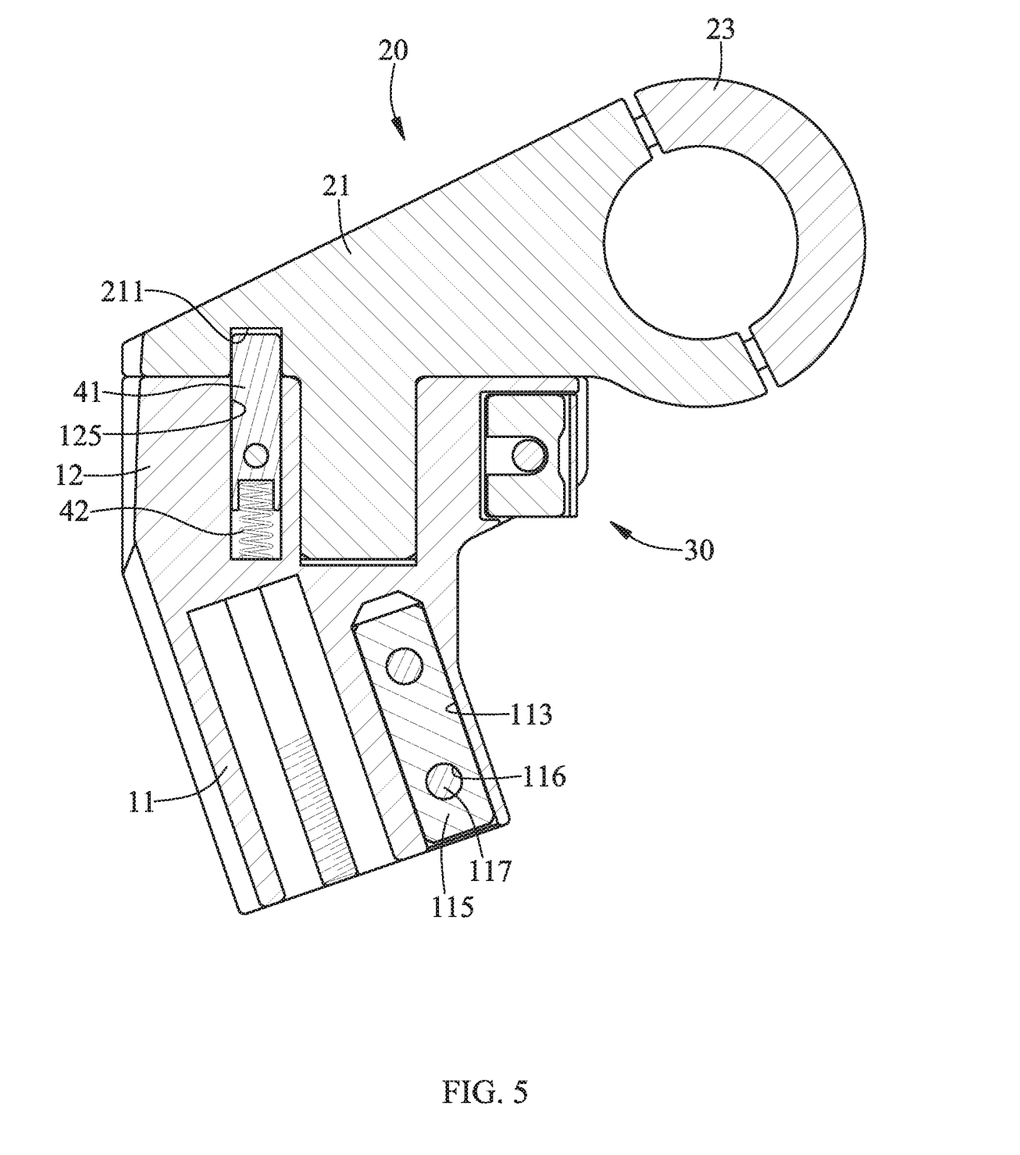
FIG. 5 is another cross-section view of a preferred embodiment in accordance with the present invention.
Figure 6:
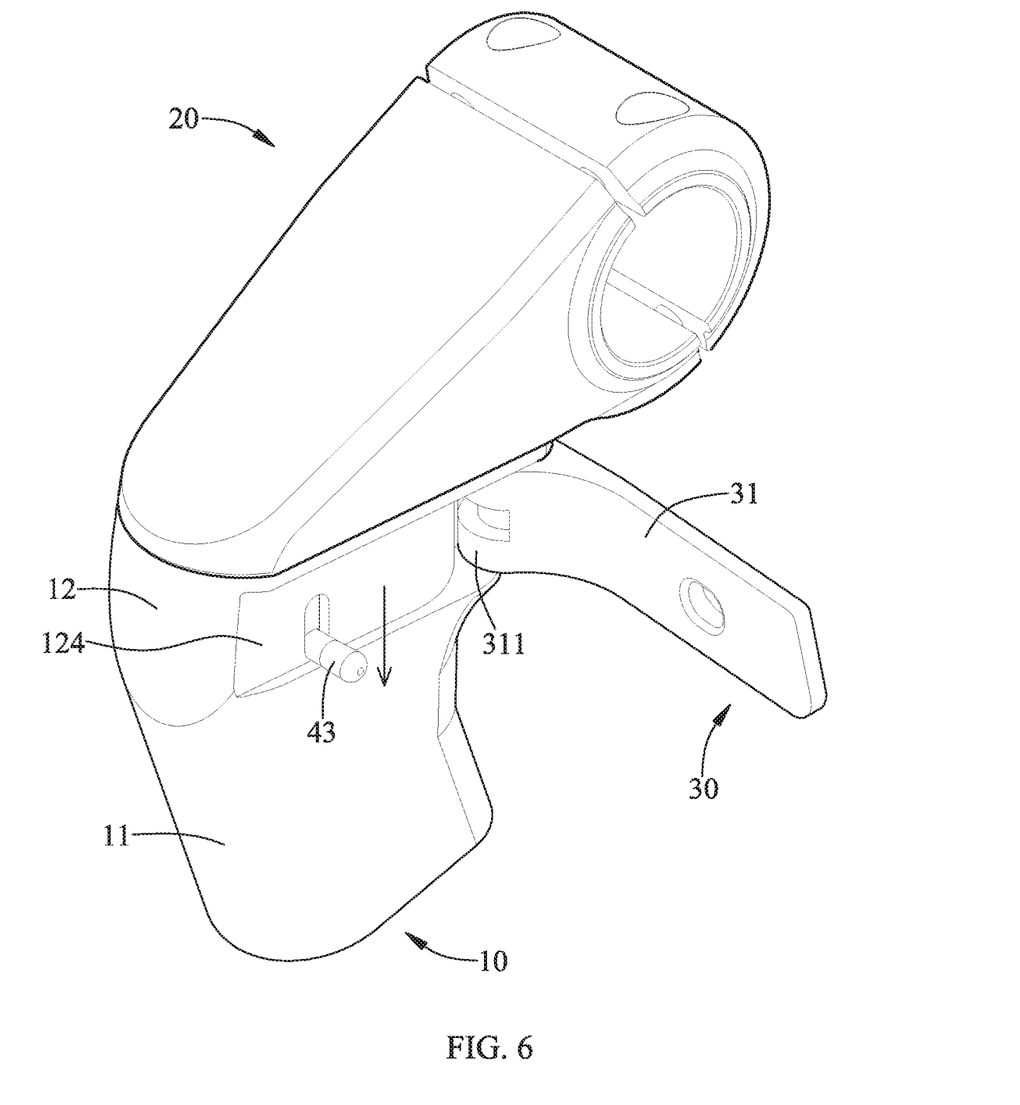
FIG. 6 is an illustration of releasing the stem from the standpipe receiving portion of a preferred embodiment in accordance with the present invention.
Figure 7:
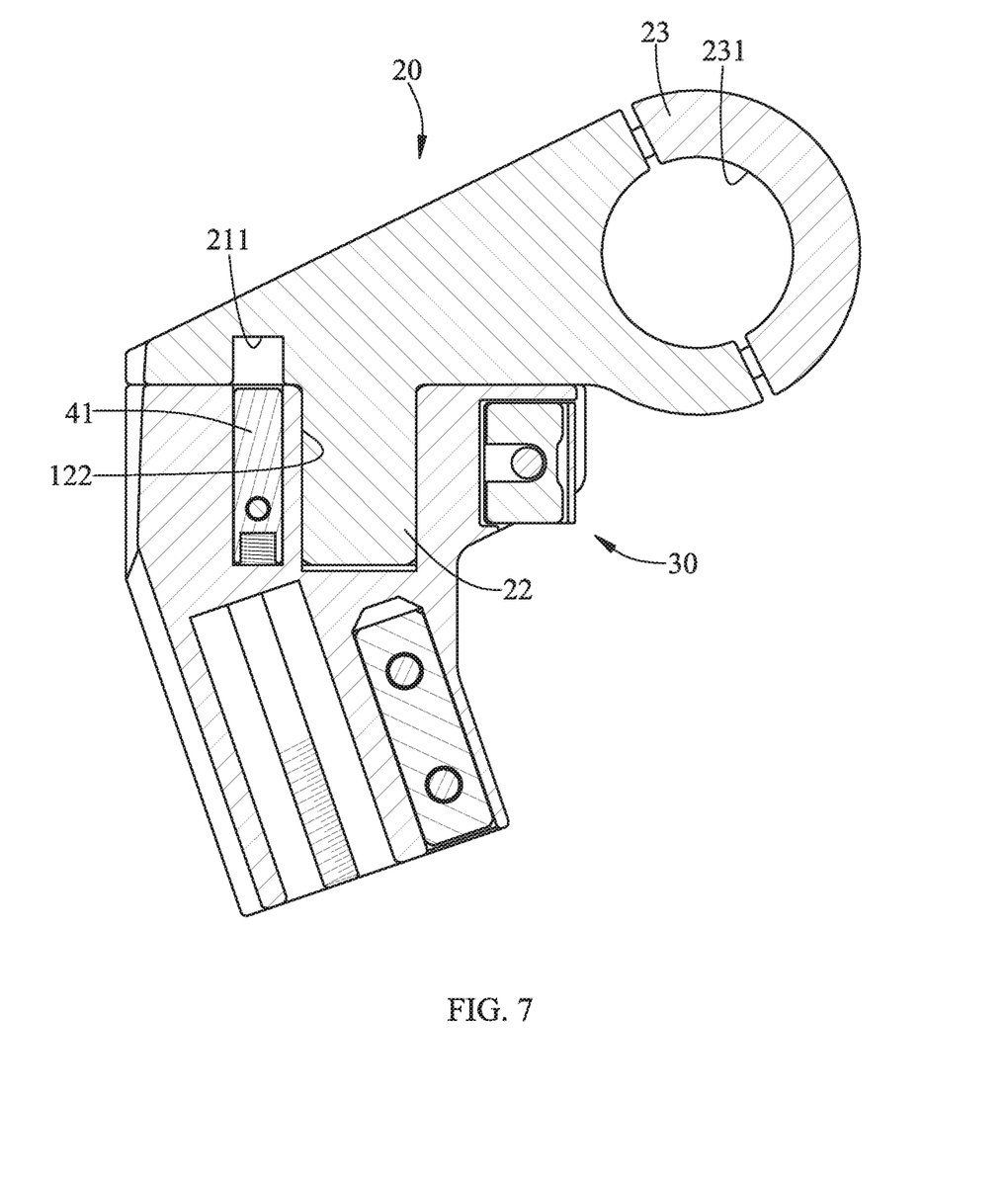
FIG. 7 is another illustration of releasing the stem from the standpipe receiving portion of a preferred embodiment in accordance with the present invention.

At a left side of the slot 13, two fixing bolt holes 112 set vertically are transversely penetrating through the front side of the tubular part 11. At a right side of the slot 13, a long groove 113 is formed from the bottom of the tubular part 11. Two connecting tunnels 114 set vertically are transversely penetrating through the slot 13 and the long groove 113. A pin 115 is adapted to be inserted into the long groove 113. Two screw holes 116 set vertically are deposited transversely through the pin 115 as shown in FIG. 4. The screw holes 116 are connected with the connecting tunnels 114 respectively. Two fixing bolts 117 are threadably deposited within the screw holes 116 respectively through two fixing bolt holes 112, two connecting tunnels 14 to the slot 13.

A fixing hole 123 is formed transversely through the deck part 12. A center of the fixing hole 123 passes through the slot 13 as shown in FIGS. 2 and 3. A quick release receiving groove 124 is formed at a right side of the deck part 12 extending from its front to its rear. A front end of the quick release receiving groove 124 is connected with an opening of the fixing hole 123. Just besides the stem receiving groove 122, a positioning pin groove 125 is formed at the top of the deck part 12. On a rear end of the quick release receiving groove 124, a pin hole 126 is formed vertically thereon. The pin hole 123 is extended in length vertically on the rear end of the quick release receiving groove 124. Two opposite ends of the pin hole 123 is connected with the positioning pin groove 125 and the quick release groove 124 respectively.

The stem 20 in this preferred embodiment comprises a stem body 21. When the stem 20 is adapted to be mounted on the standpipe 10, the stem body 21 with flat bottom will cover the top surface of the deck part 12 of the standpipe 10. A tubular neck portion 22 is extended vertically from a bottom of the stem body 21 to be received by the stem receiving groove 122. As the tubular neck portion 22 is inserted into the stem receiving groove 12, the stem 20 could be rotate along the stem rotating axis B. Corresponding to the positioning pin groove 125 on the deck part 12 of the standpipe 10, another positioning pin groove 211 is formed on the stem body 21 inwardly from its bottom. An upper end of the stem body 21 terminates in a forwardly projecting O-shaped loop 23. A handlebar hole 231 is deposited transversely inside the O-shape loop 23. A center of the O-shaped loop 23 shares a same center of the handlebar hole 231 in this preferred embodiment. An innovative feature of the present application is that, at a same plane surface, a distance between the stem rotating axis B to the center of the O-shaped loop 23 is smaller than a distance between the standpipe rotating axis A to the center of the O-shaped loop 23.

The stem fixing assembly 30 is a quick release or similar mechanism threadably mounted on the fixing hole 123 of the standpipe 10. The stem fixing assembly 30 includes a control handle 31 in a shape corresponding to the quick release receiving groove 124. An end of the control handle 31 provided with an enlarged pivot portion 311. Another end of the control handle 31 provided with another pin hole 312 corresponding to the pin hole 126 on the quick release receiving groove 124. A screw rod 32 is extended from the pivot portion 311 which could threadably fixed with the fixing hole 123 on the deck part 12 and reach to the slot 13. After passing through the fixing hole 123, a terminate end of the screw rod 32 is adapted to be fixed with a screw nut 33. Preferably, a washer 34 is configured to be set between the pivot portion 311 of the stem fixing assembly 30 and the standpipe 10.

The stem positioning assembly 40 in this embodiment includes a positioning pin 41. The positioning pin 41 is mounted inside the positioning pin groove 125 of the deck part 12. A spring 42 is mounted at a bottom of the positioning pin 41 inserted inside the positioning pin groove 125. An upper tip of the positioning pin 41 is protruded from the positioning pin groove 125 and is accepted by the positioning pin groove 211 of the stem 20. This positioning pin 41 could avoid the stem 20 rotating from the standpipe 10. A pulling pin 43 is connected with the positioning pin 41 with its end protruded through the pin hole 126 of the deck part 12 and the pin hole 312 of the stem fixing assembly 30.

Figure 8:
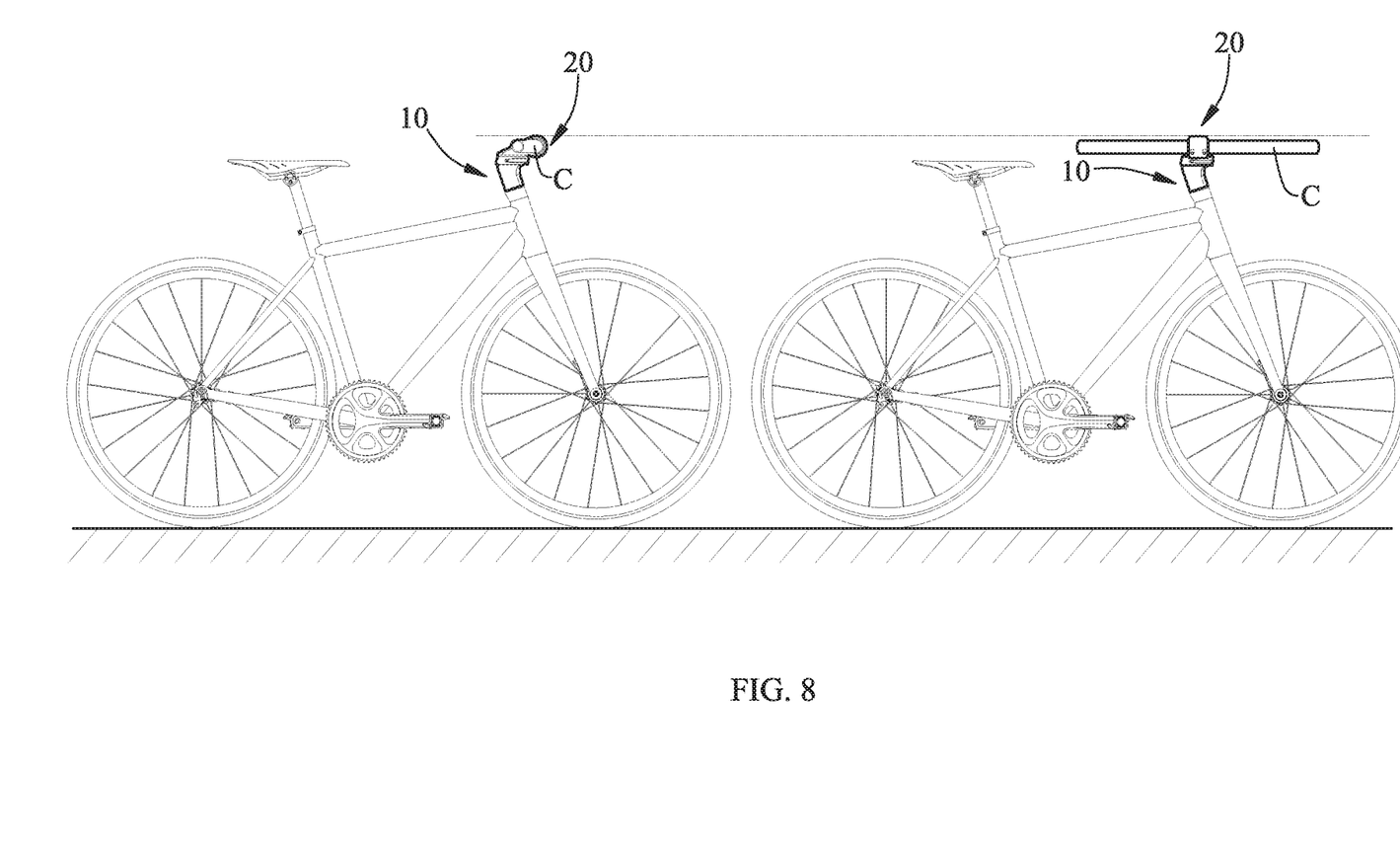
FIG. 8 is a side view illustrating before and after rotating the stem of a preferred embodiment in accordance with the present invention.

For assembly the present invention of a folding bicycle, a preferred embodiment is provided with reference to FIGS. 3 and 8. Illustrating by FIG. 8, the front fork of the folding bicycle is normally in an inclined state with an angle of 20 degrees leaning towards its rear end. The standpipe 10 of the present invention is accepted by a front fork of the folding bicycle by fixing with the two fixing bolts 117 on the front fork. The present invention could be securely mounted on the front fork further by screw tightening the standpipe bolt 14 forcing the standpipe 10 of the present invention to be securely fixed. A handlebar C could be mounted on the handlebar hole 231 of the stem 20.

FIGS. 3, 6 to 8 in this preferred embodiment of the present invention shows how to fold the stem portion of the folding bicycle using the present invention. As shown in these figures, the control handle 31 of the stem fixing assembly 30 could be pivotally pulled out from the quick release receiving groove 124. As pushing down the pulling pin 43, the positioning pin 41 will be released from the positioning pin groove 211 of the stem 20 and making the stem 20 rotatable along the stem rotating axis B.

Since the standpipe rotating axis A of the standpipe 10 and an axis of the front fork of the folding bicycle are both leaning 20 degree backwards, the stem rotating axis B will be presented perpendicular to the ground as it has an angle forwardly from the standpipe rotating axis A. Upon rotating the stem 20 with the handlebar C along with the stem rotating axis B by 90 degrees (both applicable by rotating the stem 20 to the left or right by 90 degrees), the handlebar C will remain parallel with the ground without tilting or protruding from the folding bicycle as shown in FIG. 8. This could provide the benefit of reducing a storage space when the bike is folded.

Another preferred embodiment is that the stem positioning assembly 40 could be omitted from the present invention for positioning the stem 20. One of the main functions of the stem positioning assembly 40 is to avoid the stem 20 from suddenly moving or rotating as releasing the stem fixing assembly 30. However, it is still acceptable and works functionally for the present invention with optionally adapting the stem positioning assembly 40 in the design.

The angle between the stem rotating axis B and the standpipe rotating A is adjustable according to the standpipe rotating A and the front fork of each folding bicycle leaning backwards. For example, the angle between the stem rotating axis B and the standpipe rotating A will become smaller if the standpipe rotating A and the front fork just slightly leaning backwards with smaller angle. Conversely, the angle between the stem rotating axis B and the standpipe rotating A will become larger if the standpipe rotating A and the front fork have leaned backwards with larger angle. This angle is depended on different types of bicycle. As long as the stem rotating axis B remained perpendicular with the ground after folding, the handlebar C could be prevented from tiling or protruding from the standpipe 10.

Figure 9:
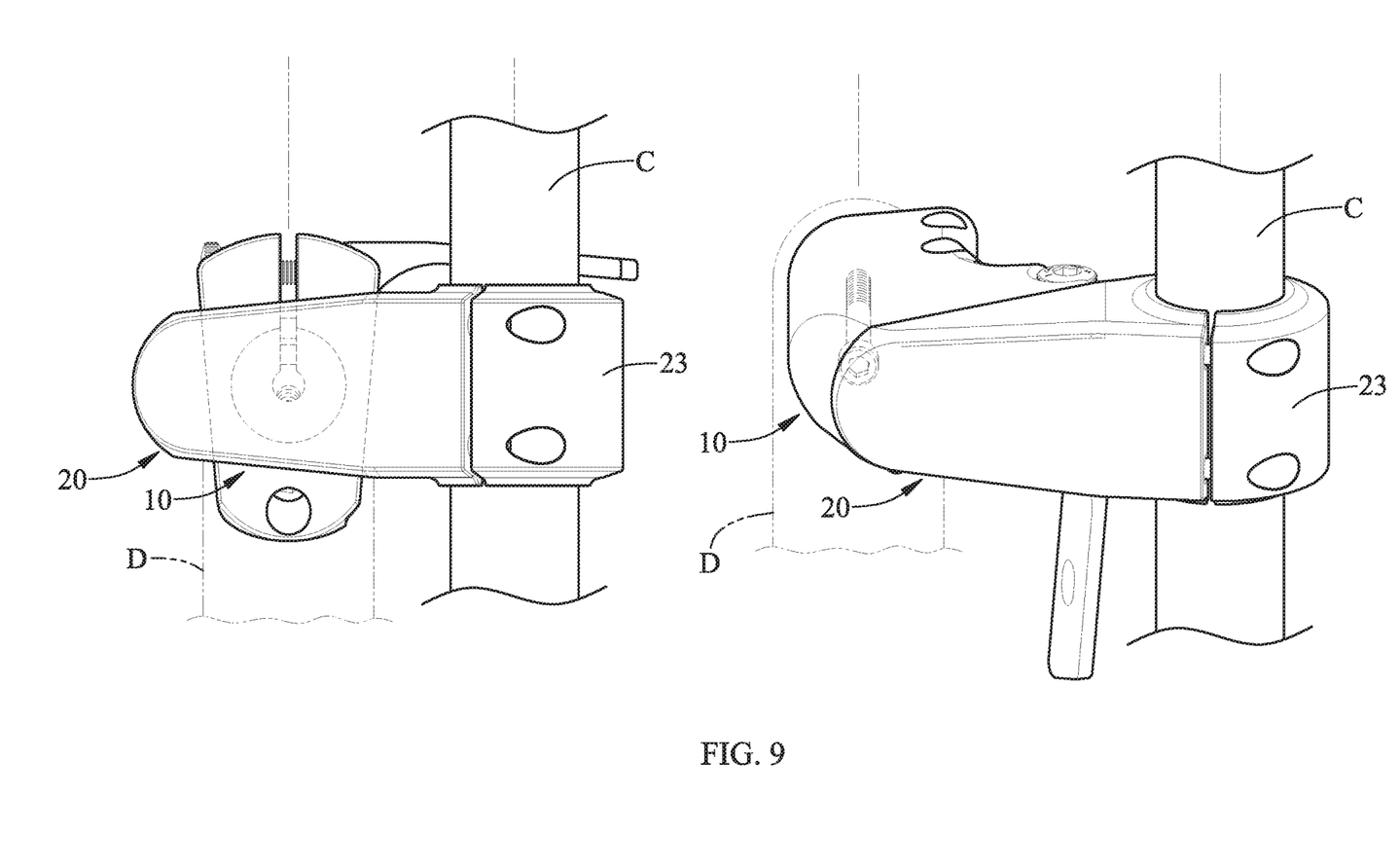
FIG. 9 is a front view illustrating before and after rotating the stem of a preferred embodiment in accordance with the present invention.

With reference to FIGS. 3 and 9, another benefit of the present invention is that the folding bicycle could have a smaller size by using the foldable mechanism provided by the present invention. Upon rotating the handlebar C with the stem 20 by 90 degrees, the distance between the stem rotating axis B and the center of the O-shaped loop 23 is smaller than the distance between the standpipe rotating axis A and the center of the O-shaped loop 23. A space between the handlebar C and a frame D of the folding bicycle could be reduced or became smaller compared with a folding mechanism of a conventional folding bicycle with both its standpipe and stem rotated when folding. Therefore, the present invention is guaranteed to provide a smaller folded size of the folding bicycle for not only facilitating storage by users but also having the benefit of being stacked or compacted more tightly when loading in a cargo car of a container for delivery. This will reduce a shipping cost for a single bike and increase a loading quantity in single container.

Figure 10:
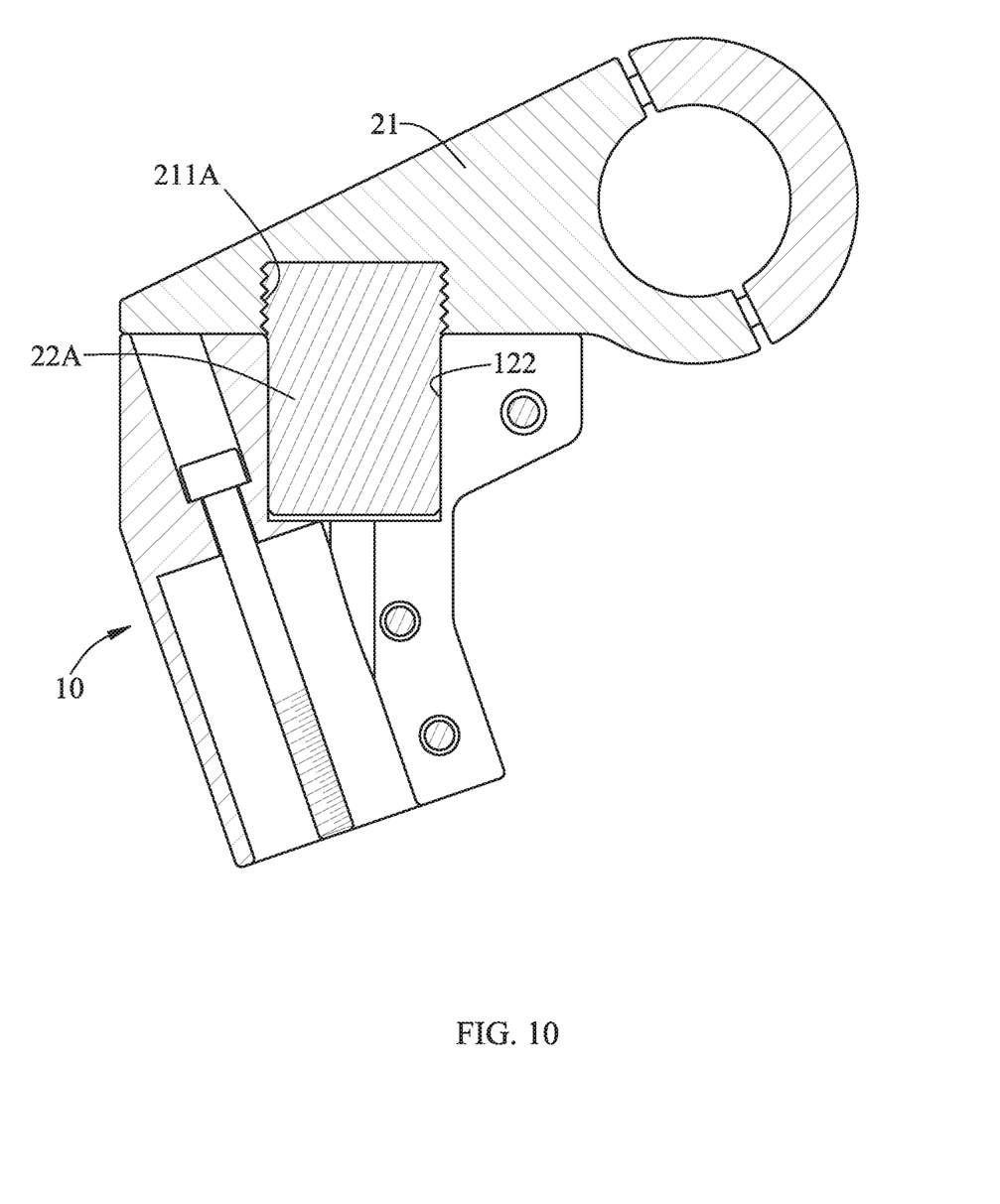
FIG. 10 is a cross-section view of a second preferred embodiment in accordance with the present invention.

Another preferred embodiment of the stem 20 of the present invention is that the tubular neck portion 22 could be designed as a detachable structure as shown in FIG. 10. Unlike the abovementioned embodiment of the stem 20 with integrated tubular neck portion 22 extended from the bottom of the stem body 21, the tubular neck portion 22 with its upper tip contained thread surface could be threadably connected to the stem body 21 with a screw positioning hole 211A formed on its bottom. The other end of the tubular neck portion 22 is still inserted into the stem receiving groove 122, that is the same as the above embodiment, to achieve the claimed function of the present invention.

Figure 11:
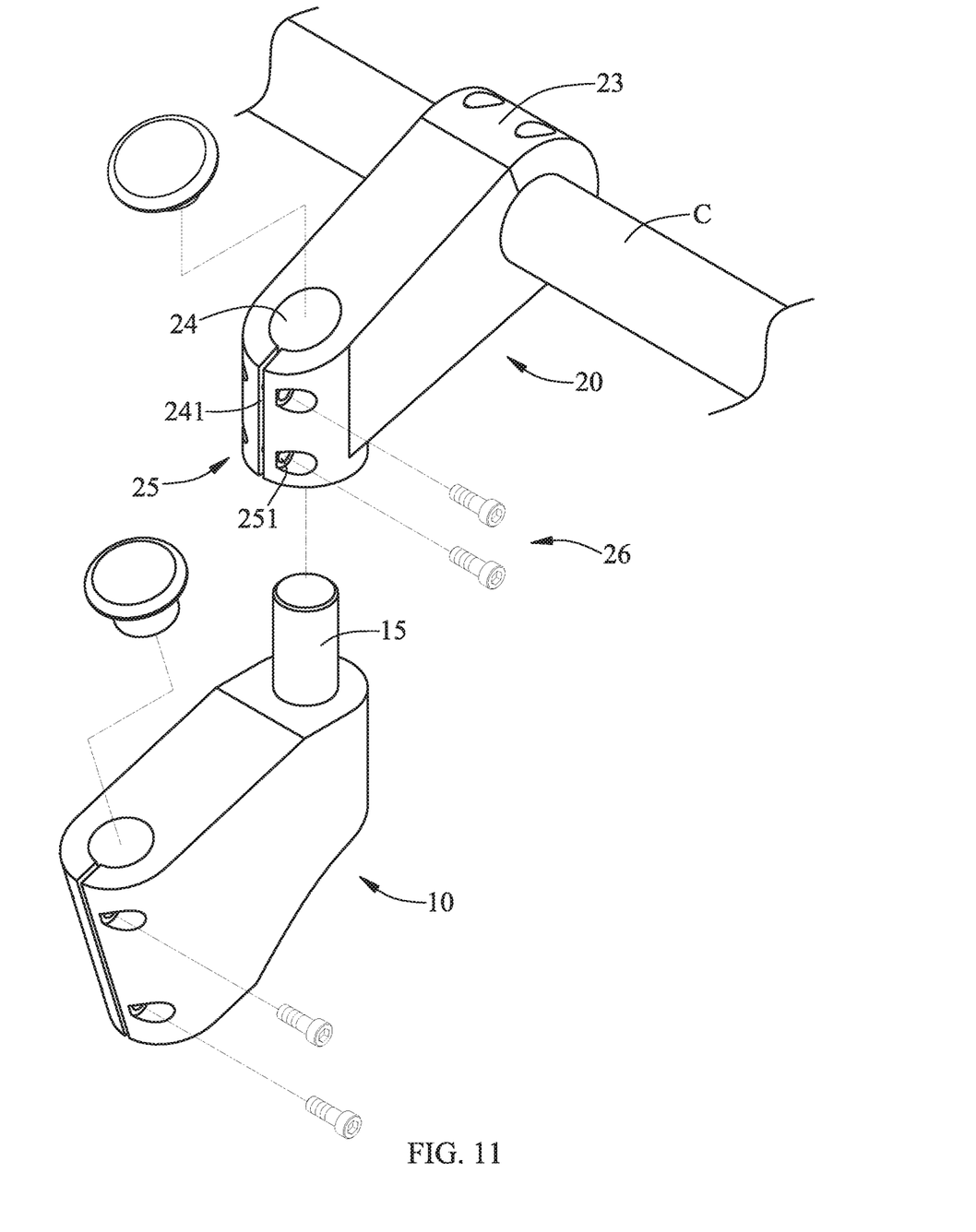
FIG. 11 is an exploded view of a third preferred embodiment in accordance with the present invention.
Figure 12:
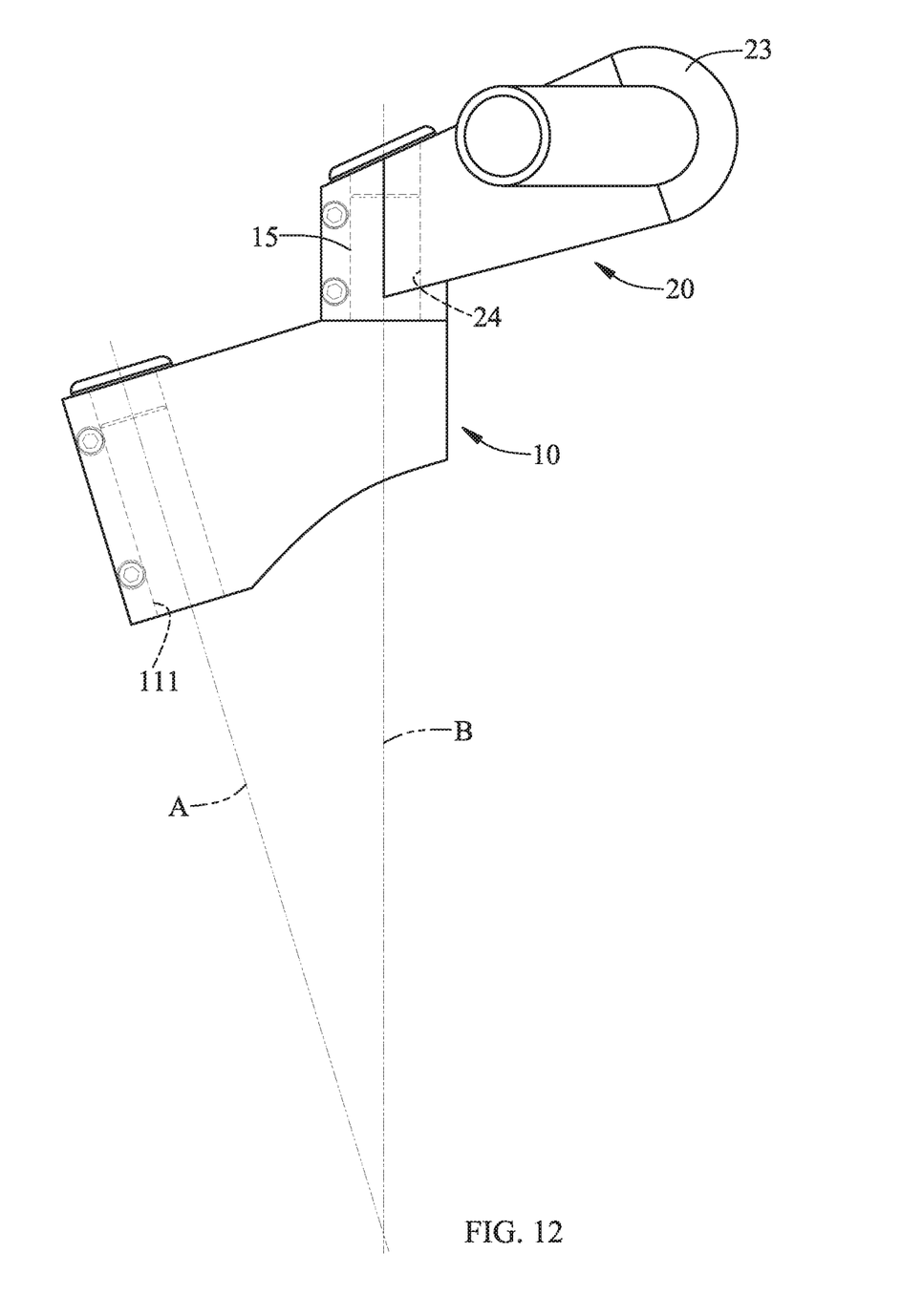
FIG. 12 is a side view of the third preferred embodiment in accordance with the present invention.

With reference to the FIGS. 11 and 12, another preferred embodiment of the present invention is presented with the tubular neck portion 22 otherwise connected or mounted on the deck part 12 of the standpipe 10. In this practice, the tubular neck portion 22 could be a tubular block 15 fixed or debatably protruding from the top surface of the deck part 12. The tubular block 15 is adapted to be inserted in a tubular block receiving groove 24 as formed inwardly from the bottom of the stem 20. The tubular block receiving groove 24 in this embodiment preferably has a receiving groove slot 241 extending vertically at its rear end. A fixing portion 25 having two screw fixing holes 251 is formed transversely along the tubular block receiving groove 24. Each screw fixing hole 251 is adapted to be secured by a bolt and nut set 26. By fixing the set of bolt and nut 25, the tubular block 15 could be tightly mounted but still rotatable with the tubular block receiving groove 24 on the stem 20.

In this preferred embodiment, the stem 20 could be released from the standpipe 10 by loosening two bolt and nut sets 26. Upon rotating the handlebar C with the stem 20 90 degrees, the distance between the stem rotating axis B and the center of the O-shaped loop 23 is smaller than the distance between the standpipe rotating axis A and the center of the O-shaped loop 23. The handlebar C will also remain parallel with the ground without tilting or protruding from the folding bicycle, creating the benefit of reducing a storage space when the bike is folded.

The above specification, examples, and data provide a complete description of the present disclosure and use of exemplary embodiments. Although various embodiments of the present disclosure have been described above with a certain degree of particularity, or with reference to one or more individual embodiments, those with ordinary skill in the art could make numerous alterations or modifications to the disclosed embodiments without departing from the spirit or scope of this disclosure.

What is claimed is:

1. A rotatable folding bicycle stem comprising:
   a standpipe receiving portion defining a standpipe rotating axis about which the standpipe receiving portion is rotatable and a stem receiving groove extending downwards from a top surface of the standpipe receiving portion;
   a stem including a tubular neck portion configured to extend from a bottom surface of the stem into the stem receiving groove, the stem is rotatably mounted on the standpipe receiving portion about a stem rotating axis which extends through the tubular neck portion;
   the standpipe receiving portion further includes a control handle pivotably disposed on a side surface of the standpipe receiving portion;
   the standpipe receiving portion further includes a first positioning pin groove formed into the top surface of the standpipe receiving portion, the first positioning pin groove configured to receiving a positioning pin, the positioning pin configured to extend from the first positioning pin groove into a second positioning pin groove formed into the bottom surface of the stem;
   wherein an upper end of the stem terminates in a forwardly projecting O-shaped loop.

2. The stem as claimed in claim 1, wherein: an angle formed by the standpipe rotating axis and the stem rotating axis is in a range of 10 to 30 degrees.

3. The stem as claimed in claim 2, wherein:
   the standpipe receiving portion comprises a tubular part with an upper end of which terminates in a deck part, the stem receiving groove formed into the deck part.

4. The stem as claimed in claim 3, wherein:
   a slot is formed at a middle of a front end of the standpipe receiving portion;
   the slot is connected with the stem receiving groove;
   a fixing hole is formed transversely through a deck part corresponding to a position of the slot; and
   a stem fixing assembly is mounted on the fixing hole.

5. The stem as claimed in claim 3, wherein:
   a pin hole is extended vertically in length and is formed at a lateral side of the first positioning pin groove and the standpipe receiving portion;
   a spring is mounted at a bottom of the positioning pin inserted inside the first positioning pin groove of the standpipe receiving portion;

an upper tip of the positioning pin is protruded from the first positioning pin groove of the standpipe receiving portion and is accepted by the second positioning pin groove of the stem; and a pulling pin is connected with the positioning pin with an end protruded through the pin hole of the standpipe receiving portion.

6. The stem as claimed in claim 2, wherein:

a pin hole is extended vertically in length and is formed at a lateral side of the first positioning pin groove and the standpipe receiving portion;

a spring is mounted at a bottom of the positioning pin inserted inside the first positioning pin groove of the standpipe receiving portion;

an upper tip of the positioning pin is protruded from the first positioning pin groove of the standpipe receiving portion and is accepted by the second positioning pin groove of the stem; and a pulling pin is connected with the positioning pin with an end protruded through the pin hole of the standpipe receiving portion.

7. The stem as claimed in claim 1, wherein: a distance between the stem rotating axis to a center of the O-shaped loop is smaller than a distance between the standpipe rotating axis to the center of the O-shaped loop in a same plane surface.

8. The stem as claimed in claim 7, wherein:

a pin hole is extended vertically in length and is formed at a lateral side of the first positioning pin groove and the standpipe receiving portion;

a spring is mounted at a bottom of the positioning pin inserted inside the first positioning pin groove of the standpipe receiving portion;

an upper tip of the positioning pin is protruded from the first positioning pin groove of the standpipe receiving portion and is accepted by the second positioning pin groove of the stem; and a pulling pin is connected with the positioning pin with an end protruded through the pin hole of the standpipe receiving portion.

9. The stem as claimed in claim 1, wherein:

the standpipe receiving portion comprises a tubular part with an upper end of which terminates in a deck part, the stem receiving groove formed into the deck part.

10. The stem as claimed in claim 9, wherein:

a slot is formed at a middle of a front end of the standpipe receiving portion;

the slot is connected with the stem receiving groove;

a fixing hole is formed transversely through the deck part corresponding to a position of the slot; and a stem fixing assembly is mounted on the fixing hole.

11. The stem as claimed in claim 10, wherein:

two fixing bolt holes are set vertically penetrating through a front side of the tubular part;

a long groove is formed from a bottom of the tubular part;

two connecting tunnels are set vertically penetrating through the slot and the long groove;

a pin is adapted to be inserted into the long groove;

two screw holes are set vertically forming transversely through the pin; and two fixing bolts are threadably connected and fixed with the screw holes respectively through the slot and each of the connecting tunnels.

12. The stem as claimed in claim 10, wherein:

an end of the control handle is provided with an enlarged pivot portion;

a screw rod is extended from the pivot portion and is threadably fixed with the fixing hole; and after passing through the fixing hole, a terminated end of the screw rod is adapted to be fixed with a screw nut.

13. The stem as claimed in claim 9, wherein:

a pin hole is extended vertically in length and is formed at a lateral side of the first positioning pin groove and the standpipe receiving portion;

a spring is mounted at a bottom of the positioning pin inserted inside the first positioning pin groove of the standpipe receiving portion;

an upper tip of the positioning pin is protruded from the first positioning pin groove of the standpipe receiving portion and is accepted by the second positioning pin groove of the stem; and a pulling pin is connected with the positioning pin with an end protruded through the pin hole of the standpipe receiving portion.

14. The stem as claimed in claim 1, wherein:

a pin hole is extended vertically in length and is formed at a lateral side of the first positioning pin groove and the standpipe receiving portion;

a spring is mounted at a bottom of the positioning pin inserted inside the first positioning pin groove of the standpipe receiving portion;

an upper tip of the positioning pin is protruded from the first positioning pin groove of the standpipe receiving portion and is accepted by the second positioning pin groove of the stem; and a pulling pin is connected with the positioning pin with an end protruded through the pin hole of the standpipe receiving portion.

* * * * *